United States Patent [19]
Smith

[11] Patent Number: 4,794,727
[45] Date of Patent: Jan. 3, 1989

[54] WHEEL-ABOUT GREENHOUSE

[76] Inventor: Kevin J. Smith, 47 Highfields Rd., Abington, Mass. 02351

[21] Appl. No.: 72,005

[22] Filed: Jul. 10, 1987

[51] Int. Cl.$^4$ .......................... A01G 9/16; B62B 1/20
[52] U.S. Cl. ........................................ 47/17; 47/69;
   47/66; 280/47.34; 280/47.26; 280/7.14;
   280/491 R; 280/767; D34/25
[58] Field of Search .................. 47/17, 19, 29, 69, 66;
   298/2, 4, 5; 280/47.34, 47.26, 14, 7, 14, 491 R,
   767; D11/145; D34/24, 25, 26, 17, 19

[56] References Cited

U.S. PATENT DOCUMENTS

| | | | |
|---|---|---|---|
| D. 184,781 | 3/1959 | Todd | D34/19 |
| D. 223,104 | 3/1972 | Looms | D34/19 |
| D. 250,689 | 1/1979 | Lee | D34/19 |
| 2,456,939 | 12/1948 | Haase | 280/47.34 |
| 2,757,937 | 8/1956 | Illsley | 280/47.26 |
| 2,817,536 | 12/1957 | Taggert | 280/14 |
| 3,106,801 | 10/1963 | Risacher | 47/17 |
| 4,470,610 | 9/1984 | Wilson | 280/7.14 |

FOREIGN PATENT DOCUMENTS

| | | | |
|---|---|---|---|
| 96945 | 12/1983 | European Pat. Off. | 47/17 |
| 1482286 | 4/1969 | Fed. Rep. of Germany | 47/17 |
| 2823863 | 12/1979 | Fed. Rep. of Germany | 47/17 |
| 3301236 | 7/1984 | Fed. Rep. of Germany | 47/17 |

*Primary Examiner*—Robert A. Hafer
*Assistant Examiner*—Danton D. DeMille
*Attorney, Agent, or Firm*—Leon Gilden

[57] ABSTRACT

A portable wheel-about greenhouse is provided formed with a transparent top portion of double wall insulated construction configured to engage in interfitting relationship with a bed portion also formed of double wall construction providing further insulation to said bed thereby. Said transparent cover portion may be positioned in spaced relationship to said bed portion periodically by means of spacer elements positionable at respective corners of the bed and cover members. At least one pair of over-sized wheels are utilized for ease of portability and convenience in transport of said greenhouse from one site to another.

7 Claims, 4 Drawing Sheets

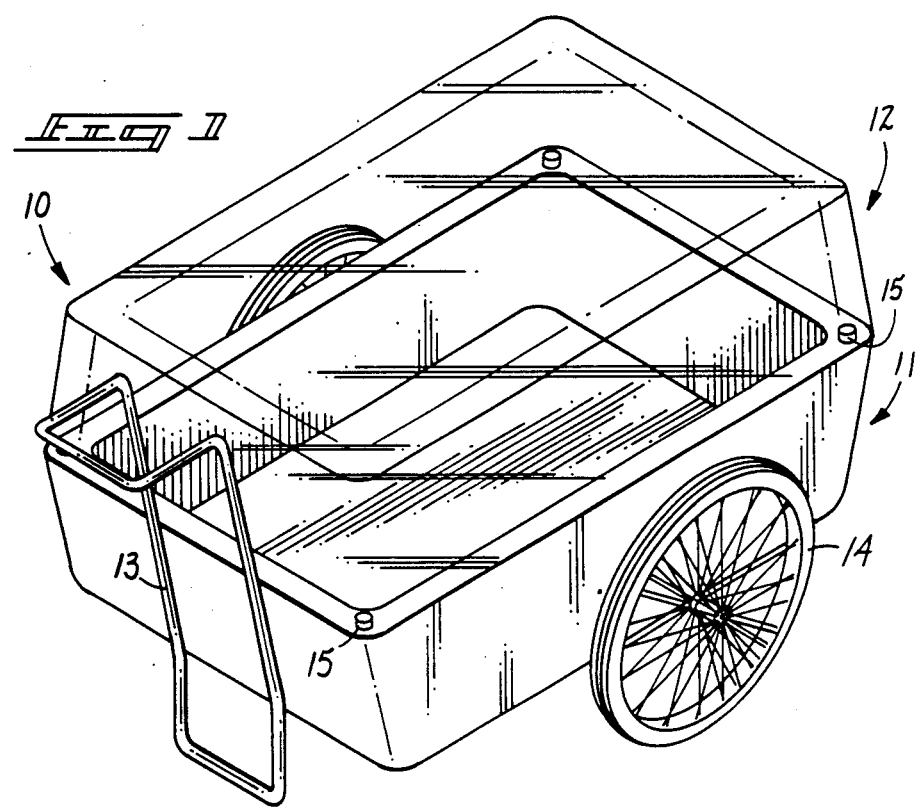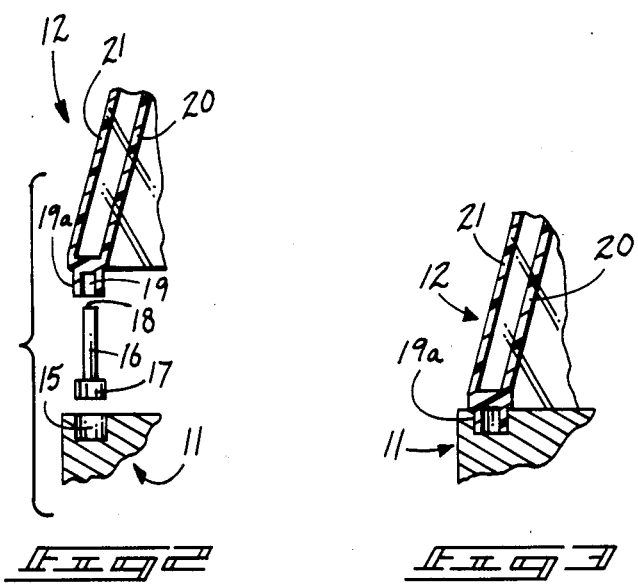

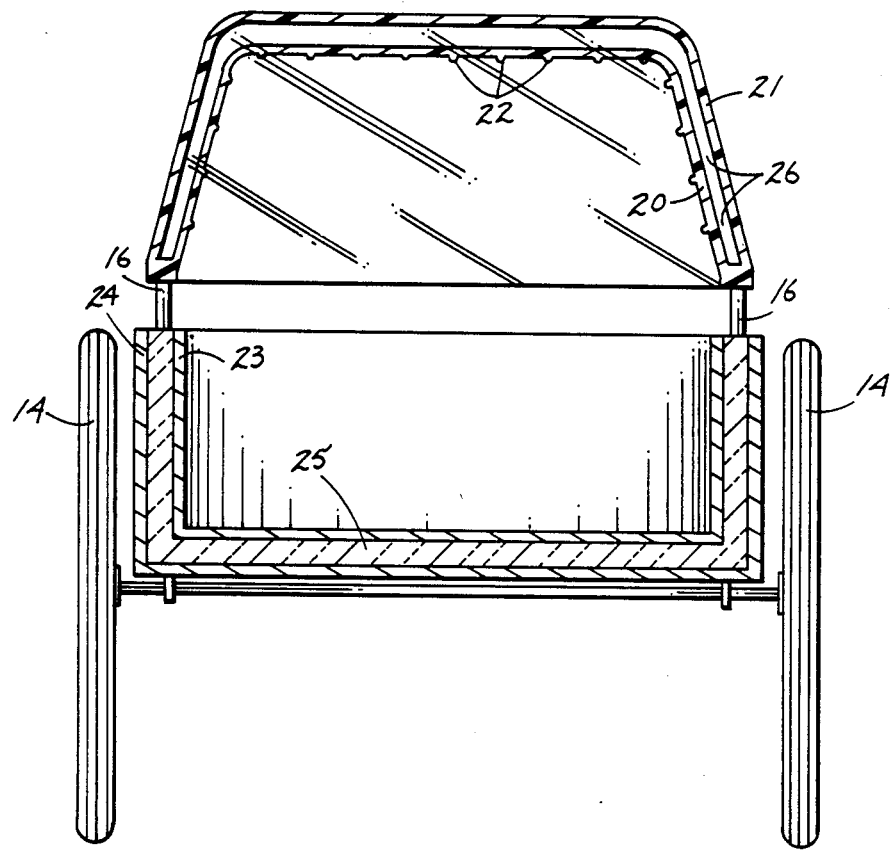

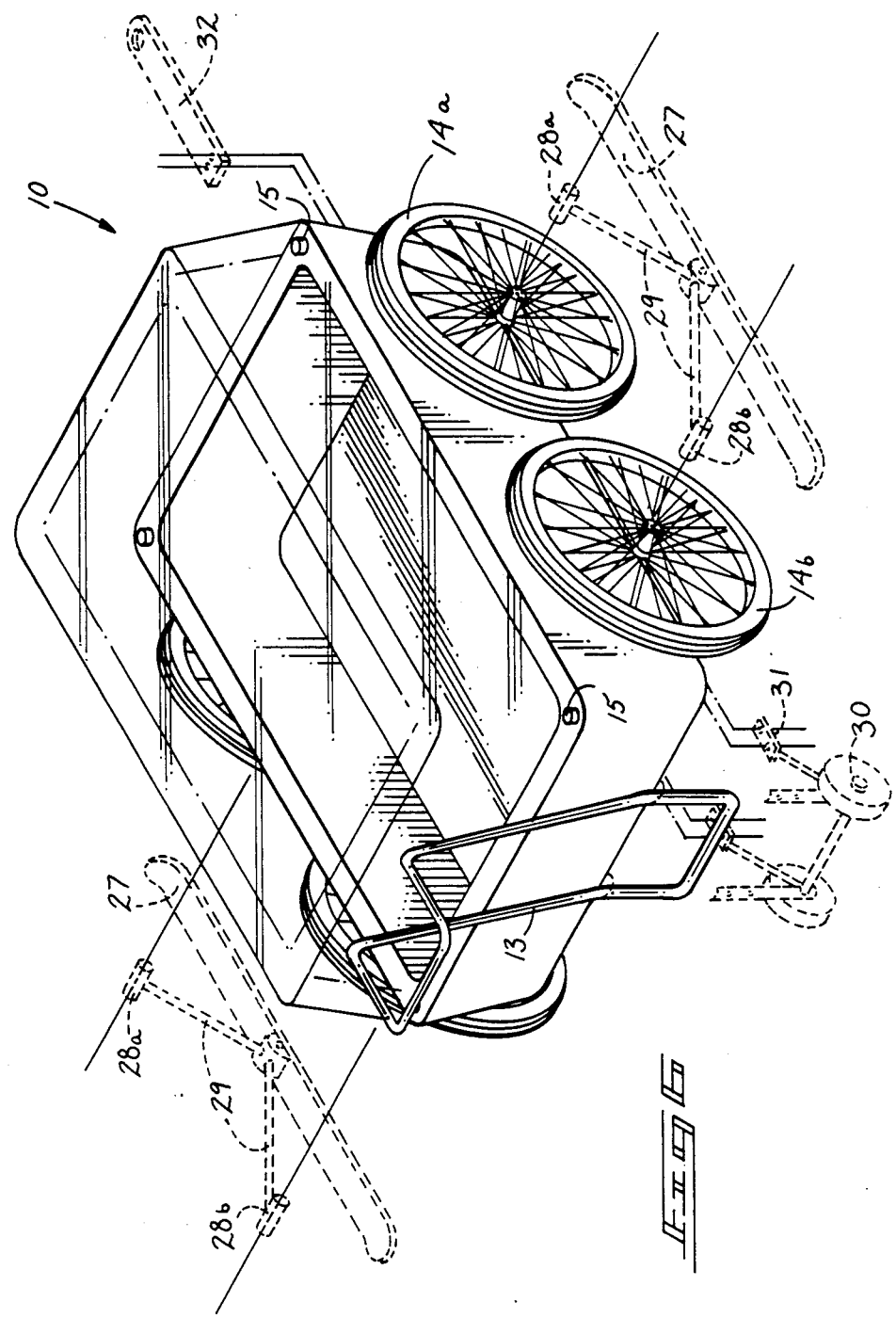

WHEEL-ABOUT GREENHOUSE

BACKGROUND OF THE INVENTION

1. Field of the Invention

The present invention relates to greenhouses, and more particularly to a new improved portable greenhouse, which by virtue of its portability may be positioned as desired to take advantage of varying climactic conditions.

2. Description of the Prior Art

The use of greenhouses is well known in the prior art. As may be appreciated, devices of the prior art have required substantial amounts of permanent space or alternatively they have been of such minimal dimensional proportions as to accommodate few plants and thereby they uniformly lacked the ability to accommodate sufficient quantities for propogation and transport purposes. It may further be appreciated that a major obstacle for a portable greenhouse of useful size has been the proportional weight associated with the bulk of earth and liquids necessary for proper plant development.

As greenhouse usage is frequently affected during the early spring periods, the need for heating of such structures is an ever present problem not having been properly solved by the prior art. For example, U.S. Pat. No. 3,121,975 to Duhamel, sets forth a portable greenhouse of single layer construction whose portability is greatly dependent upon secondary vehicles. The main thrust of the Duhamel patent is to provide an air-tight container with a provision of introducing pressurized air such that the internal pressure of the container be of greater pressure than atmospheric. U.S. Pat. No. 3,324,593 to Strasser sets forth a greenhouse supported by wheel members supporting nestable separate chamber portions enabling processing of plant cultivation. U.S. Pat. No. 3,606,697 to Eden sets forth a tray-like member with a transparent top therefore provided with a heating element to provide germination heat to the lowermost portion. U.S. Pat. No. 4,216,741 to Moss sets forth a wheeled multi-level chamber enabling a passage of predetermined gases or aerosols therethrough. U.S. Pat. No. 4,244,145 to Polacsek sets forth an indoor plant growing apparatus with included artificial light enabling positioning of a bed thereover to utilize normally wasted space beneath a bed. U.S. Pat. No. 4,244,146 to Kranz sets forth a permanent greenhouse structure revolvably mounted to take advantage of directed sunlight.

SUMMARY OF THE INVENTION

In view of the foregoing disadvantages inherent in the known types of greenhouses now present in the prior art, the present invention provides an improved wheel-about greenhouse. As such, the general purpose of the present invention, which will be described subsequently in greater detail, is to provide a new and improved greenhouses which has all the advantages of the prior art greenhouses and none of the disadvantages.

To attain this, the present invention provides a portable greenhouse along with at least a plurality of oversized wheels enabling portability and maneuverability thereof. A transparent cover is secured to the lower portion or bed in a secure interfitting relationship. Both transparent cover and lower bed portion are each formed of double wall re-enforced construction with an air gap in the transparent cover and an air gap or insulation in the bed portion for total insulation of the wheel-about greenhouse's contents. Additionally, spacer elements enable spaced positiong of the cover above the bed when ventilation of the portable greenhouse contents is desired.

My invention resides not fin any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat and Trademark Office and the public generally, and especially the scientists, engineers and practitioners in the art who are not familiar with patent or legal terms of phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved wheel-about greenhouse which has all the advantages of the prior art greenhouses and none of the disadvantages.

It is another object of the present invention to provide a new and improved wheel-about greenhouse which may be easily and efficiently manufactured and marketed.

It is a further object of the present invention to provide a new and improved wheel-about greenhouse which is of a durable and reliable construction.

An even further object of the present invention is to provide a new an improved wheel-about greenhouse which is susceptible of a low cost of manufacture with regard to both materials and labor, and which accordingly is then susceptible of low prices of sale to the consuming public, thereby making such greenhouses economically available to the buying public.

Still yet another object of the present invention is to provide a new and improved wheel-about greenhouse which provides in the apparatuses and methods of the prior art some of the advantages thereof, while simultaneously overcoming some of the disadvantages normally associated therewith.

Still another object of the present invention is to provide a new and improved wheel-about greenhouse of double wall construction in both the transparent cover and opaque bed enabling insulation of contents positioned therein.

Yet another object of present invention is to provide a new and improved wheel-about greenhouse formed with at least a plurality of wheels enabling increased mobility and portability of said greenhouse.

Even still another object of the present invention is to provide a new and improved wheel-about greenhouse with a limited amount of physical effort.

Another object of my invention is to provide a new and improved wheel-about greenhouse with spacer elements selectively securable to said cover and base members respectively.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric view of my invention illustrating its various parts, configuration and relationship.

FIG. 2 is an orthographic side view somewhat enlarged illustrating the spacers utilized in a somewhat expanded view.

FIG. 3 is an orthographic side view of my invention illustrating the transparent cover without the spacers in contrast to FIG. 2.

FIG. 5 is an orthographic cross-sectional view of my invention of FIG. 4 taken on the line 5—5 thereon in the direction indicated by the arrows.

FIG. 6 is an isometric view of a modification of my invention illustrated in a plurality of sets of wheels additionally illustrating in phantom various optional elements as utilized with my invention.

DESCRIPTION OF THE PREFERRED EMBODIMENT

Figure 4:
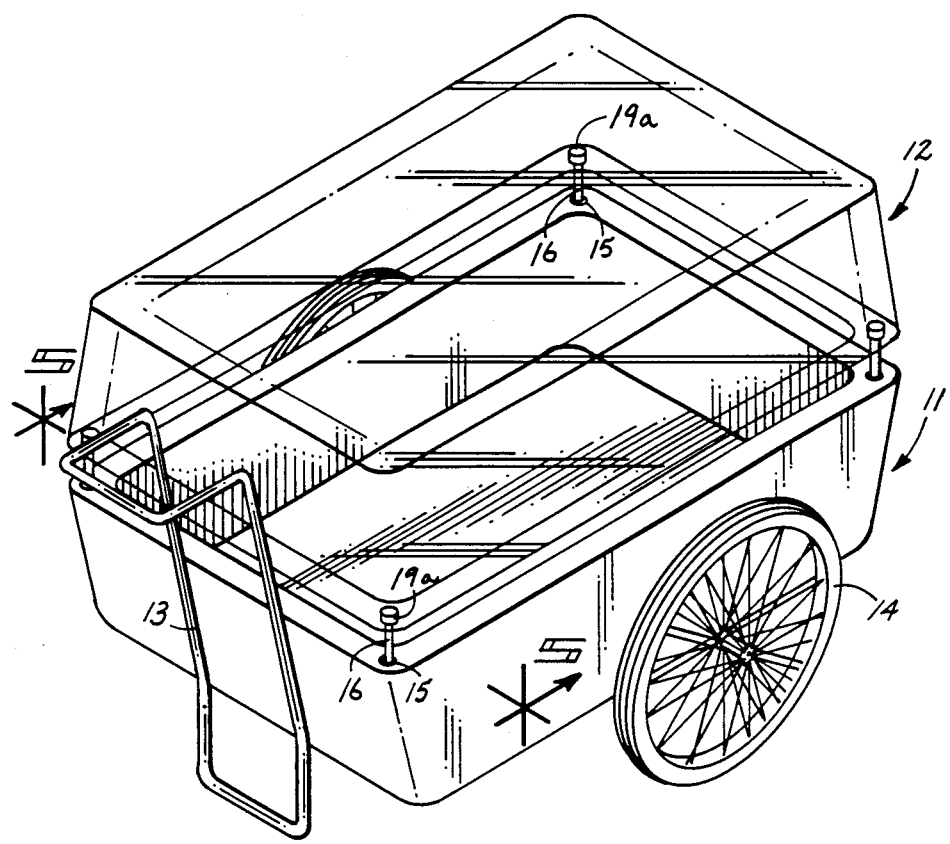
FIG. 4 is an isometric view of my invention similar to that as illustrated in FIG. 1 wherein the spacers are utilized.

With reference now to the drawings, and in particular to FIG. 1 thereof, a new and improved mobile greenhouse embodying the principles and concepts of the present invention and generally designated by the reference numeral 10 will be described.

Mobile greenhouse 10 is formed with a base 11 and cover 12, as illustrated in FIG. 1. A tubular handle element of generally "L" shaped construction is illustrated as secured to base portion 11. Tubular handle 13 has uppermost portion configured as a projection for easy manipulation and grasping by a user projecting downwardly past its securement to base member 11 to form a support portion to provide greenhouse 10 necessary stability. As illustrated, tubular handle 13 is formed as a single shaped element for ease of manufacture and construction but clearly may be configured as desired for the purposes intended. Oversized wheels 14 are secured somewhat medially of the base portion 11 by a conventional single axle attached to the underside of base portion 11.

Transparent cover portion 12 is illustrated in FIG. 1 in its normal position relative to base portion 11. FIG. 2 illustrates the use of optional spacer rods 16 nestable within base blind bores 15. Spacer rod 16 has at its lowermost portion a foot element 17 and upper ends 18 to interfit with borders 15 and cover blind bores 19 respectively. As noted, the cover blind bores 19 are formed within cylindrical projections 19a whereas when spacer rod 16 are not to be used, cylindrical projections 19a will securedly interfit with base blind bores 15. Of note in FIG. 2 and 3 are the illustrated plural walls formed as inner wall 20 and outer wall 21 respectively of transparent cover 12.

FIG. 4 illustrates my invention with spacer rods 16 in position enabling ventilation of my mobile portable greenhouse 10. As illustrated in FIG. 4, it may be noted that firm securement means of spacer rods 16 within respective bores 15 and 19 enable mobility of my greenhouse, as desired, while maintaining a stable organization. When spacer elements 16 are deleted from the organization of my invention it presents a substantially air-tight environment within the chamber formed by base 11 and cover 12 in interfitting relationship, as illustrated per FIGS. 1, 3 and 6.

FIG. 5 illustrates cover portion 12 defining therebetween an insulative dead air space 26 defined by outer walls 20 and 21 respectively. Further illustrated in FIG. 5 are a series of drip elements 22 enabling collection of ambient water condensate thereon for a rain-like effect onto whatever plant-like contents may be positioned within my mobile greenhouse. Drip elements 22 may be in the form of points or ribs, as desired, in a configuration dependent on the particular intended use, or in fact may be deleted altogether with the subsequent loss of their effect. Base portion 11, as illustrated in FIG. 5, is configured of an inner base wall 23 and an outer base wall 24 capturing therebetween insulation 25 for purposes of providing an insulative effect of my greenhouse 10. Alternatively a dead air space may be captured between respective walls 23 and 24 of base portion 11 but use of insulation of various commercial types has proved to be beneficial.

FIG. 6 illustrates my mobile 10 with optional accessories that may be utilized, as needed. In this embodiment, a plurality of wheel pairs 14a and 14b may be utilized for support of greenhouse contents of excessive weight. For transport from one geographic location to another of various greenhouse contents, optional skis are illustrated as securable to base portion 11 by means of respective forward cylindrical securement 28 and rearward cylindrical securement portion 28b attachable to the axle supporting wheels 14a and 14b upon removal of said wheels from base portion 11. Forward and rearward securement portions 28a and 28b are supported upon skis 27 by support elements 29. Additionally, accessory wheels 30 are attachable by means of suitable bracketry 31 to the base portion 11. These accessory wheels may be utilized in conjunction with plural sets of wheels 14a and 14b, or alternatively, accessory wheels 30 may be utilized with a single wheel pair 14. As illustrated, accessory wheels 30 will attach to base portion 11 at a height to maintain base portion 11 substantially parallel to the surface it is to traverse. To this end, an optional trailer hitch 32 also illustrated in phantom may be utilized for attachment to a self-propelled vehicle, such as a garden tractor, etc., to assist in transport of my mobile greenhouse.

As to the manner and usage and operation of the present invention, the same can depend on the above description. Accordingly no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mobile greenhouse comprising,
   a. a base portion formed with plural double walls defining an insulative barrier between the double walls, and
   b. a cover member for overlying securement to said base portion, said cover member formed with plural double walls defining an insulative barrier between the double walls, and
   c. wheel means of a first diameter secured to said base portion for mobility of said mobile greenhouse, and
   d. handle means including a support portion secured to said base portion for enabling manual motive force to be applied to said mobile greenhouse, and wherein said cover member is formed with a series of individual equally spaced downwardly projecting drip means along an interior surface of said cover member for enhancing condensation of water vapor thereon for equally spaced deposit of condensed water vapor therebelow.

2. A mobile greenhouse as set forth in claim 1 wherein said base portion is formed with a plurality of blind bores for interfitting relationship with mating cylindrical projections formed on said cover member when said cover member is positioned on said base portion.

3. A mobile greenhouse as set forth in claim 2 wherein elongate spacer means are positionable in both the cylindrical projections and blind bores for selective spacing of said cover member relative to said base portion.

4. A mobile greenhouse as set forth in claim 3 wherein said elongate spacer means is formed with a first elongate cylindrical upper portion of a first diameter with an integrally attached second elongate cylindrical portion of a second diameter greater than that of said first diameter.

5. A mobile greenhouse as set forth in claim 1 wherein said wheel means includes a plurality of pairs of wheels of a first diameter secured to said base portion.

6. A mobile greenhouse as set forth in claim 5 wherein said wheel means includes a further plurality of wheels of a second diameter substantially less than that of said first diameter securable to said base portion.

7. A mobile greenhouse as set forth in claim 1 wherein a trailer hitch means is securable to said base portion at a side of said base portion remote from said handle means.

* * * * *